March 20, 1951   C. W. MARTIN   2,545,483
TIRE BEAD AND RETAINING RING TOOL
Filed June 10, 1947   2 Sheets-Sheet 1
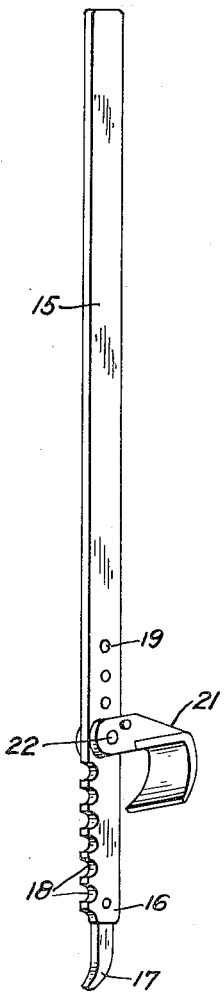
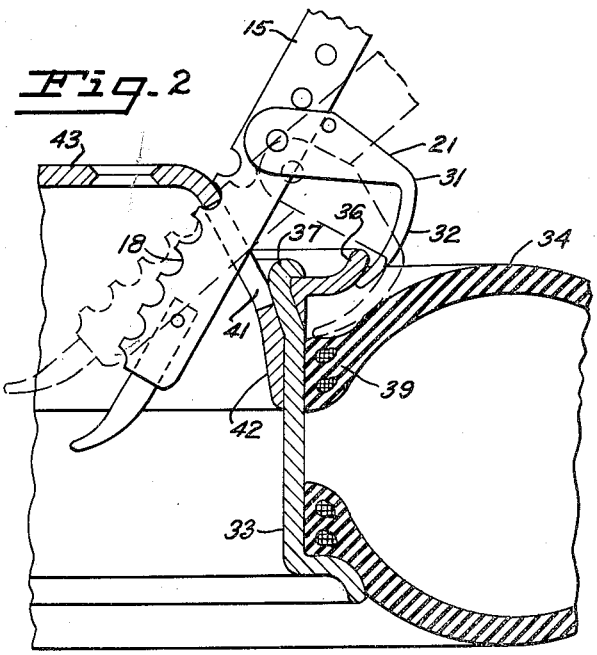
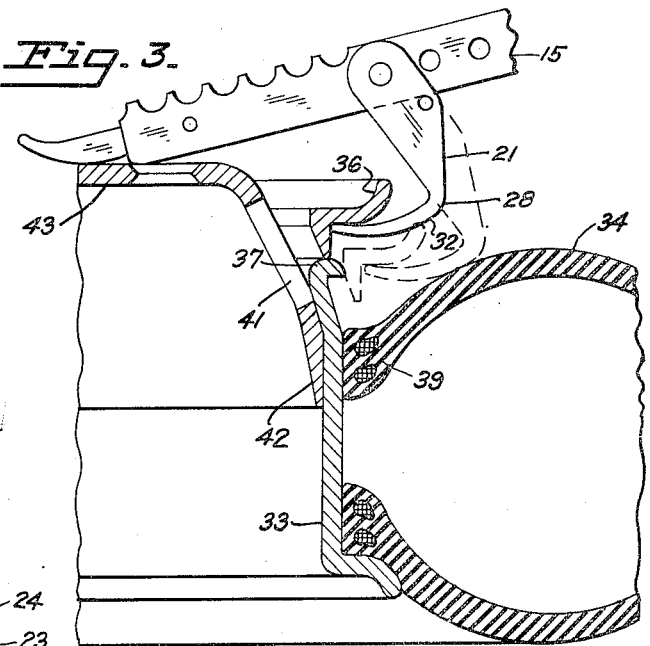
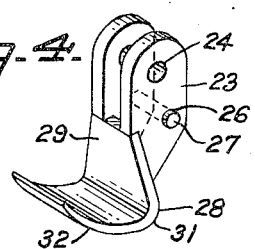
INVENTOR.
CLAUDE W. MARTIN
BY George B White
ATTORNEY.

March 20, 1951 C. W. MARTIN 2,545,483
TIRE BEAD AND RETAINING RING TOOL
Filed June 10, 1947 2 Sheets-Sheet 2
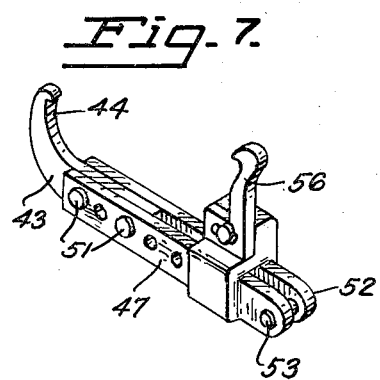
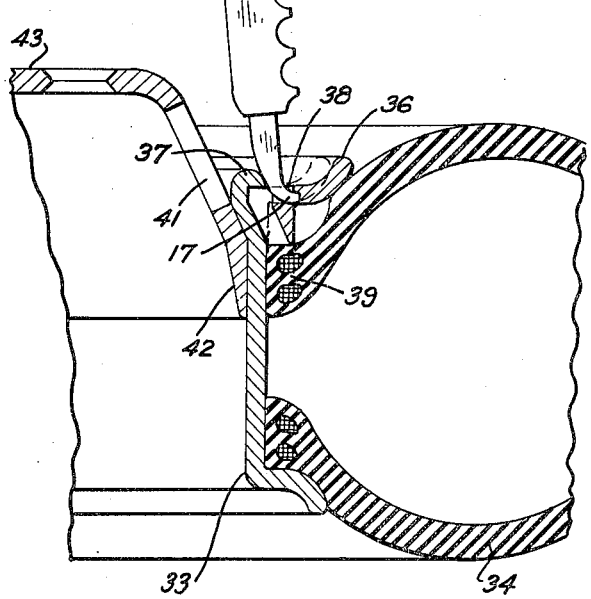
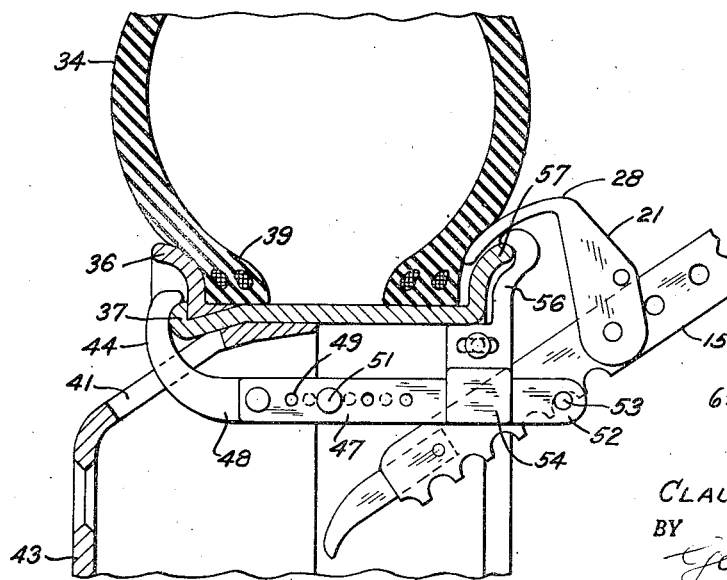
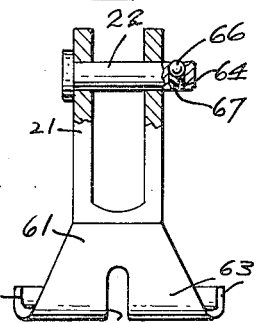
INVENTOR.
CLAUDE W. MARTIN
BY George B. White
ATTORNEY.

Patented Mar. 20, 1951

2,545,483

UNITED STATES PATENT OFFICE 2,545,483

TIRE BEAD AND RETAINING RING TOOL

Claude W. Martin, Gold Hill, Oreg.

Application June 10, 1947, Serial No. 753,625

4 Claims. (Cl. 157—1.3)

This invention relates to tire changing tool.

The tire changing tool herein described is of the same general type as the tool described in my Patents Nos. 2,290,887, granted July 28, 1942, and 2,317,072, granted on April 20, 1943.

The general object of this invention is to provide on a tire changing tool of this type a fulcrum arm which is also used for the removal of the lock ring from the rim of a tire; and which is also adapted to loosen up so called "frozen" or very tight tires from the rims thereof; and which cooperates for a variety of purposes either on the tool as a unit or in combination with other suitable clamping or jack devices on the rim.

It will be understood that various changes may be made in the details of construction herein shown provided said changes come within the scope of the claims herein.

The invention is clearly illustrated in the accompanying drawings wherein:

Fig. 1 is a perspective view of the tool with the novel combined prying and fulcrum arm thereon.

Fig. 2 is a fragmental sectional view showing the application of the tool for the loosening of the tire away from the lock ring.

Fig. 3 is a fragmental sectional view showing the operation of the tool for lifting the lock ring from the rim.

Fig. 4 is a perspective view of the combination fulcrum arm.

Fig. 5 is a fragmental sectional view, showing the engagement of the point of the tool for the removal or prying out of a recent type of lock ring from the rim at the point of the bar.

Fig. 6 is a fragmental sectional view showing the application of the tool in combination with a rim clamp and jack for leverage.

Fig. 7 is a perspective detail view of the clamping device shown in Fig. 6.

Fig. 8 is a partly sectional rear view of a modified form of the yoke and prying shoe and its pivot.

The bar or hand lever 15 in this form has a prying end 16 which is provided with a removable point 17. A plurality of notches 18 on one edge of the bar 15 are provided for engagement with the edges of holes in the top or face of the tire disc, or other suitable edge surfaces. A plurality of holes 19 are formed through the side bar 15 spaced between the notches 18 and the handle end of the bar.

The combination prying and fulcrum arm 21 is pivoted in any of the selected holes 19 by means of a pivot pin 22. The combination arm in this instance includes a yoke 23 which straddles the bar 15. It is to be noted that the bar 15 is flat, at least at the portions around the holes 19, to allow such pivoting and straddling. The yoke 23 has suitable pivot holes 24 therein which are aligned with the selected hole 19. The shoe is pivoted on the pivot pin 22 in said holes 19 and 24. The yoke is along the edge of the bar opposite from the edge on which the notches 18 are located. Through another set of aligned holes 26 in the arms of the yoke 23, which are spaced and offset to one side of the pivot holes 24, is extended a stop pin 27 for the purpose of limiting the back swing of the fulcrum arm and engaging the adjacent edge of the bar 15.

On the free end of the yoke and along the inner face of the same is provided a prying shoe 28. This shoe is made of a suitable quality of steel or other material adapted for the prying and pulling action required.

In the present illustration the shoe 28 is integral with the pivot yoke 23. The base 29 of the shoe is on the face of the yoke 23 adjacent the bar 15 and it widens toward a corner 31 so that its edges diverge toward said corner. The corner 31 is substantially at right angles and the engaging hook 32 of the shoe extended therefrom is curved and flares in width toward its point as shown in Fig. 1. This shoe may be removed so as to provide for variations for tires and rims of various sizes. The location of the shoe is also adjustable by removing the pivot pin 22 and placing the shoe over another hole 19 on the bar 15 according to the leverage and adjustment desired.

As shown in the drawings the device is used in connection with a tire rim 33 on which is usually mounted a pneumatic tire 34 which is held in place by a locking ring 36 which extends under a low retaining flange 37 around one edge of the tire rim 33. Such locking rings 36 have an engagement slit or hole 38 therein into which the point 17 of the bar 15 can be inserted as shown in Fig. 5 so that the point 17 bears against the flange 37 and pushes the locking ring away and out from under the flange 37, when so desired.

In normal operation first the side and bead 39 of the tire is to be pushed away from the locking ring 36. This is accomplished by the application of the bar and shoe in the manner illustrated in Fig. 2. The bar 15 is inserted in a hole 41 of the disc 42 of the wheel so that one of the notches 18 engages an edge of the hole 41 nearer the center of the wheel. Thus the shoe 28 extends toward the tire and the hook 32 thereof is placed between the bead 39 of the tire and the locking ring 36. Then the bar 15 is pushed down toward the tire and the foot is pressed on the outer face or back of the yoke 21, utilizing the yoke as a treadle. Under this downward force even extremely tight, so called "frozen," tires can be loosened and pushed away from the locking ring. This operation is repeated as the tool is shifted around the periphery under the locking ring and the tire bead is pressed from its initial position shown in full lines in Fig. 2 to the ultimately depressed position indicated by the broken lines. The friction of large tires is usually sufficient to hold the bead 39 in such depressed position while the tool is applied to the lifting of the locking ring out from the rim 33. After the side and bead of the tire have been pushed away from the locking ring, the bar is applied as seen in Figure 5 to push the locking ring away and out from under the flange 37 to the position shown in dotted lines in Figure 3.

The next step is accomplished as shown in Fig. 3 where the end of the bar 15 is placed upon the hub 43 of the wheel and bears against the same. The hook 32 of the shoe 28 is placed under the locking ring in the manner shown in Fig. 3 in broken lines, and by exerting an upward pull on the handle end of the bar 15 the locking ring is sprung away from the rim 33 and from the tire to the full line position shown in Fig. 3. By repeating this operation around the circumference of the locking ring at spaced points the locking ring can be quickly removed with a minimum need for manual force.

In Fig. 6 another application of the shoe to the removal of a tire is illustrated, in combination with a jack device, for releasing a tire bead from the rim on the side opposite from the locking ring. A clamp hook 44 is adapted to engage the low rim flange 37 from the outside. The stem 48 of the hook 44 is telescoped into an arm 47. The arm 47 and the stem 48 of the hook 44 have aligned holes 49 thereon through which pins 51 may be extended for holding the two telescoping elements in position for any adjusted lengths. The free end of the arm 47 is formed as a fork 52. Through the extreme free end of this fork 52 extends a bearing pin 53. Spaced from this bearing pin 53 is a bracket 54 which extends from the fork 52 substantially parallel with the hook 44, and terminates in another hook 56 adapted to engage the upper edge of the higher rim flange 57 opposite from the low rim flange 37. When this jack is adjusted to the proper span to accommodate a rim of a certain width, and the hooks 44 and 56 are placed over the respective flanges, they can be held clamped in such adjusted position by the pins 51. Then by inserting the end of the bar 15 between the forks of the end 52 and engaging one of the notches 18 with the bearing pin 53, the hook 32 of the shoe 28 can be inserted between the tire rim flange 57 and the adjacent bead of the tire, as shown in Fig. 6. Then by forcing the free end of the bar 15 upwardly or toward the tire, such force transmitted through the stop pin 27 to the shoe 28 will free and release the tire bead from the higher flange 57. The resultant force is transmitted from the shoe hook 42 to the tire to force it away from the flange 57. In this manner the bead of the tire can be freed from the higher flange 57 if necessary either before or after the removal of the locking ring as heretofore described.

The shoe fulcrum member herein described in its various combinations and functions, adapts the tool for a greater variety of purposes, and particularly facilitates the removal of tires and tire rings of the type which were designed to give greater width to standard wheel rims and are provided for safer and firmer gripping. The fulcrum operation, and directional application of forces in connection with such locking rings and rims, as well as in connection with any tire which otherwise would be difficult to remove, is greatly facilitated. The manual force required for the removal of tires is minimized, the speed of operation is greatly improved.

A modified form of the prying and fulcrum arm is shown in Fig. 8. In this form the shoe 61 is divided by a slot 62 into two spaced prying prongs or hooks 63. It is also to be noted that the yoke pin 22 is provided with novel means to prevent its accidental removal. Near the point of the pin 22 is provided a transverse hole 64 in which is held a ball catch 66, yieldably pressed toward a restricted end of the hole 64 so as to protrude beyond the pin periphery. A resilient rubber pad 67 compressed in the hole 64 resiliently urges the ball catch 66 to protruding position. This allows the insertion or removal of the pin 22 by exerting some force, but prevents accidental removal.

I claim:

1. In a tire changing tool of the character described, a bar, an edge of the bar having spaced engagement notches thereon, a prying member pivoted on the bar so as to be swingable at the edge opposite from said notched edge, said prying member including a yoke pivoted on the bar, a curved shoe extended from said yoke toward said bar, and a stop on said yoke to limit the swinging of the shoe away from said opposite edge of said bar.

2. In a tire changing tool of the character described, a bar, an edge of the bar having spaced engagement notches thereon, a prying member pivoted on the bar so as to be swingable at the edge opposite from said notched edge, said prying member including a yoke pivoted on the bar, and a curved shoe extended from said yoke toward said opposite edge of said bar, and a stop on said yoke to limit the swinging of the shoe away from said opposite edge of said bar, said bar having a series of pivot holes therethrough, and a detachable pivot for fulcruming said yoke in a selected hole of said series.

3. In a tire changing tool of the character described, a bar, an edge of the bar having spaced engagement notches thereon, a prying member pivoted on the bar so as to be swingable at the edge opposite from said notched edge, and a hooked prying shoe on said member extended toward said opposite edge of said bar, said shoe being transversely flat, and curving toward its tip edge.

4. In a tire changing tool of the character described, a bar, an edge of the bar having spaced engagement notches thereon, a prying member pivoted on the bar so as to be swingable at the edge opposite from said notched edge, said prying member including a yoke pivoted on the bar, and a curved shoe extended from said yoke toward said opposite edge of said bar, the back of said yoke being formed into a treadle-like step surface.

CLAUDE W. MARTIN.

(References on following page)

REFERENCES CITED

The following references are of record in the file of this patent:

UNITED STATES PATENTS

| Number | Name | Date |
|---|---|---|
| 840,938 | Heller et al. | Jan. 8, 1907 |
| 1,208,184 | Mayer | Dec. 12, 1916 |
| 1,219,948 | Kaehler | Mar. 20, 1917 |
| 1,448,211 | Grassfield | Mar. 13, 1923 |
| 1,520,599 | Robertson | Dec. 23, 1924 |
| 2,317,072 | Martin | Apr. 20, 1943 |

FOREIGN PATENTS

| Number | Country | Date |
|---|---|---|
| 362,166 | Great Britain | Dec. 3, 1931 |
| 390,722 | France | Aug. 6, 1908 |